United States Patent [19]

Dunn et al.

[11] Patent Number: 5,493,248
[45] Date of Patent: Feb. 20, 1996

[54] INTEGRATED CIRCUIT FOR SENSING AN ENVIRONMENTAL CONDITION AND PRODUCING A HIGH POWER CIRCUIT

[75] Inventors: William C. Dunn, Mesa; Ljubisa Ristic, Phoenix; Bertrand F. Cambou, Mesa; Lewis E. Terry, Phoenix; Raymond M. Roop, Scottsdale, all of Ariz.

[73] Assignee: Motorola, Inc., Schaumburg, Ill.

[21] Appl. No.: 933,968

[22] Filed: Aug. 24, 1992

Related U.S. Application Data

[63] Continuation of Ser. No. 576,861, Sep. 4, 1990, abandoned.

[51] Int. Cl.$^6$ .......................... H01L 35/00; H01L 25/00; H03K 3/00
[52] U.S. Cl. .......................... 327/512; 327/513; 327/564; 327/565; 327/108
[58] Field of Search .......................... 328/1–6; 307/270, 307/308–311, 491, 278; 357/46; 327/512, 513, 564, 565, 108

[56] References Cited

U.S. PATENT DOCUMENTS

| | | | |
|---|---|---|---|
| 3,875,434 | 4/1975 | Harden et al. | 328/1 |
| 3,898,486 | 8/1975 | Wessel et al. | 328/1 |
| 3,930,201 | 12/1975 | Ackermann et al. | 328/1 |
| 4,032,953 | 6/1977 | Suzuki | 257/414 |
| 4,100,563 | 7/1978 | Clark | 357/27 |
| 4,157,506 | 6/1979 | Spencer | 328/1 |
| 4,256,985 | 3/1981 | Goodson et al. | 328/1 |
| 4,317,126 | 2/1982 | Gragg, Jr. | 357/26 |
| 4,463,274 | 7/1984 | Swartz | 307/491 |
| 4,465,075 | 8/1984 | Swartz | 128/672 |
| 4,972,099 | 11/1990 | Amano et al. | 307/311 |
| 5,101,253 | 3/1992 | Mizutani et al. | 257/414 |

OTHER PUBLICATIONS

Leonard, IC Fabrication Techniques Sculpt Silicon Sensors, Electronic Design (Oct. 26, 1989), pp. 39–46.
Allan, Sensors In Silicon, High Technology (Sep. 1984), pp. 43–51 and 71.
K. W. Lee and B. E. Walker, Silicon Micromachining Technology For Automotive Applications, SAE Technical Papers, pp. 1–10.
Barth, Silicon Sensors Meet Integrated Circuits, IEEE Spectrum, (Sep. 1981), pp. 33–39.
Grebene, Bipolar and MOS Analog Integrated Circuit Design, (John Wiley & Sons 1984), pp. 309–316, 314–315.
S. M. Sze, Physics Of Semiconductor Devices, (2d ed. John Wiley & Sons 1981) pp. 772–773.
Motorola Bipolar Power Transistor Data, 1987, pp. iii–v.

*Primary Examiner*—David C. Nelms
*Assistant Examiner*—Trong Phan
*Attorney, Agent, or Firm*—Kevin B. Jackson

[57] ABSTRACT

An environmental sensor integrated with high current drive device is provided. An environmental sensor is fabricated on a semiconductor substrate using conventional MOS process used for N-well CMOS logic and DMOS power transistors. An N-well is preferably used as a junction etch stop for micromachining of mechanical sensor components. A high voltage P-type region is used to electrically isolate the high current device from the sensor device. By locating the sensor device away from the high current drive device on a common semiconductor substrate, good performance can be achieved from the sensor even while the high current device dissipates a large amount of power.

7 Claims, 2 Drawing Sheets

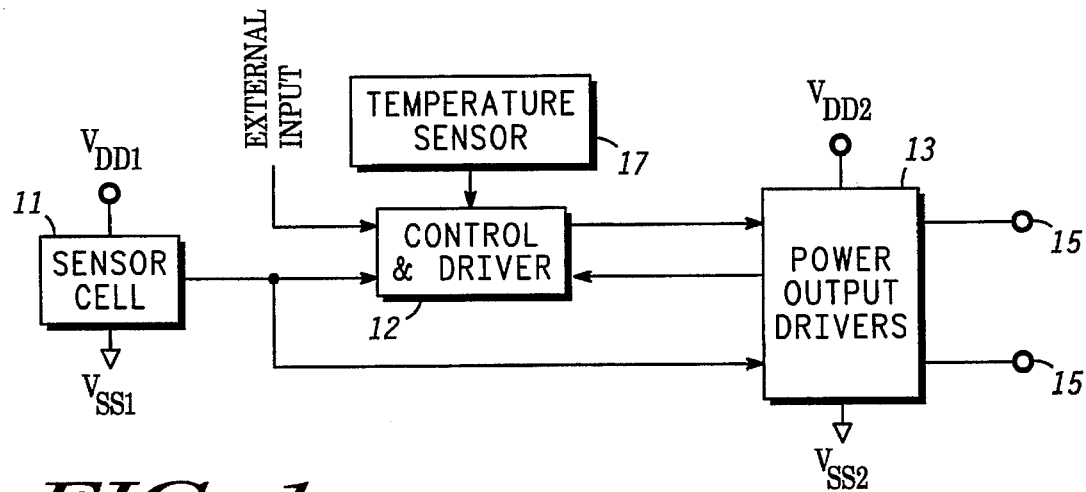
FIG. 1
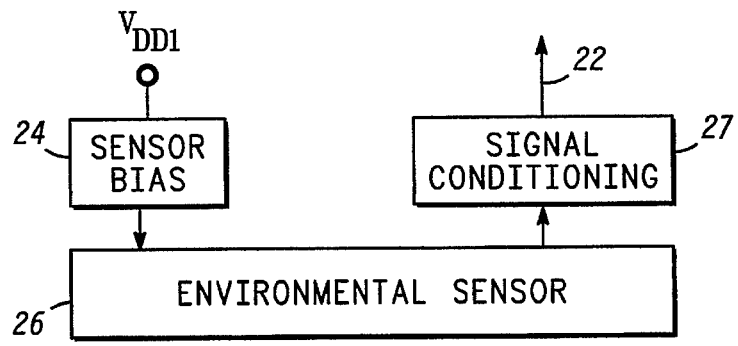
FIG. 2
FIG. 3
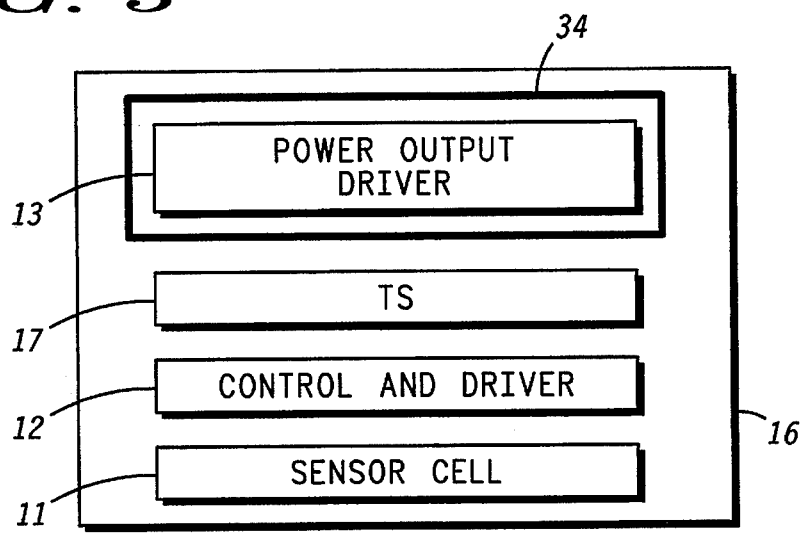

INTEGRATED CIRCUIT FOR SENSING AN ENVIRONMENTAL CONDITION AND PRODUCING A HIGH POWER CIRCUIT

This application is a continuation of prior application Ser. No. 07/576,861, filed Sep. 4, 1990.

BACKGROUND OF THE INVENTION

This invention relates, in general, to sensors and more particularly, to a sensor having an integrated high current drive capability.

A wide variety of solid state sensor devices are available which produce electrical output in response to environmental conditions. The sensors can be broken generally into several basic categories: mechanical sensors, temperature sensors, magnetic field sensors, optical sensors, and chemical sensors. Sensor devices are often identified by a particular application such as biomedical sensor and gas sensors, but these generally fit into one or more of the basic categories.

In general, sensors tend to be temperature sensitive. Also, most sensors are effected by electrical noise. These factors have made it difficult to integrate high current devices with sensors because high current devices operate at high temperatures and produce significant electrical noise. Where it has been necessary to control high current loads with a sensor device, multiple devices have been used to avoid these noise problems. Multiple device solutions are both more expensive and less reliable than single device solutions. It is desirable to have a single device which can perform both sensing and produce a high current output controlled by the sensed signal.

Recently, integrated sensors have become available with both passive and active compensation circuits built on the same chip as the sensor device. Compensation has been limited primarily to temperature compensation. Examples of such devices in pressure sensors are found in U.S. Pat. No. 4,463,274 and U.S. Pat. No. 4,465,075 issued to Craig C. Swartz. Such devices are useful in providing some preconditioning to the sensor output before the output signal is passed to the other circuitry. Some pressure sensors are commercially available with integrated signal amplification capability. These devices, however, are not able to deliver high current to a load.

Although high current devices, such as DMOS and bipolar transistors, and sensors are both solid state devices, their differences in construction and operation have led the semiconductor industry to shun their integration. Pressure sensors and accelerometers, for example, required delicate micro-machining and carefully controlled processing which has not been compatible with MOS devices. Micro-machining requires silicon etching which weakens silicon substrates and increases breakage during processing. High current transistors, on the other hand, are complex devices which are too expensive to risk breakage. In the case of non-mechanical sensors, high current devices can be adversely affected by exposure to the environmental signal such as light, a magnetic field, or chemical exposure. Until now, high current devices have not been designed to operate in these environments. The fact that high current device designers have little familiarity with sensor design and vice versa has also slowed progress and limited recognition of the need for sensors having high current drive capability, and the particular problems associated with their integration.

Accordingly, it is an object of the present invention to provide solid state sensor monolithically integrated with a high current device.

Another object of the present invention is to provide a means for isolating the high current device from an environmental signal to which the sensor is exposed.

A further object of the present invention is to provide a sensor using processes which are common to high current device manufacture.

SUMMARY OF THE INVENTION

These and other objects and advantages of the present invention are achieved by an environmental sensor integrated with high current drive device. An environmental sensor is fabricated on a semiconductor substrate using conventional MOS process used for N-well CMOS logic and DMOS power transistors. An N-well is preferably used as a junction etch stop for micromachining of mechanical sensor components. A high voltage P-type region is used to electrically isolate the high current device from the sensor device. By locating the sensor device away from the high current drive device on a common semiconductor substrate, good performance can be achieved from the sensor even while the high current device dissipates a large amount of power.

BRIEF DESCRIPTION OF THE DRAWINGS

FIG. 1 is a block diagram of the integrated sensor device of the present invention;

FIG. 2 illustrates a detailed block diagram of a sensor cell shown in FIG. 1;

FIG. 3 illustrates a plan view of an monolithic integrated circuit layout of the present invention.

DETAILED DESCRIPTION OF THE DRAWINGS

Figure 4:
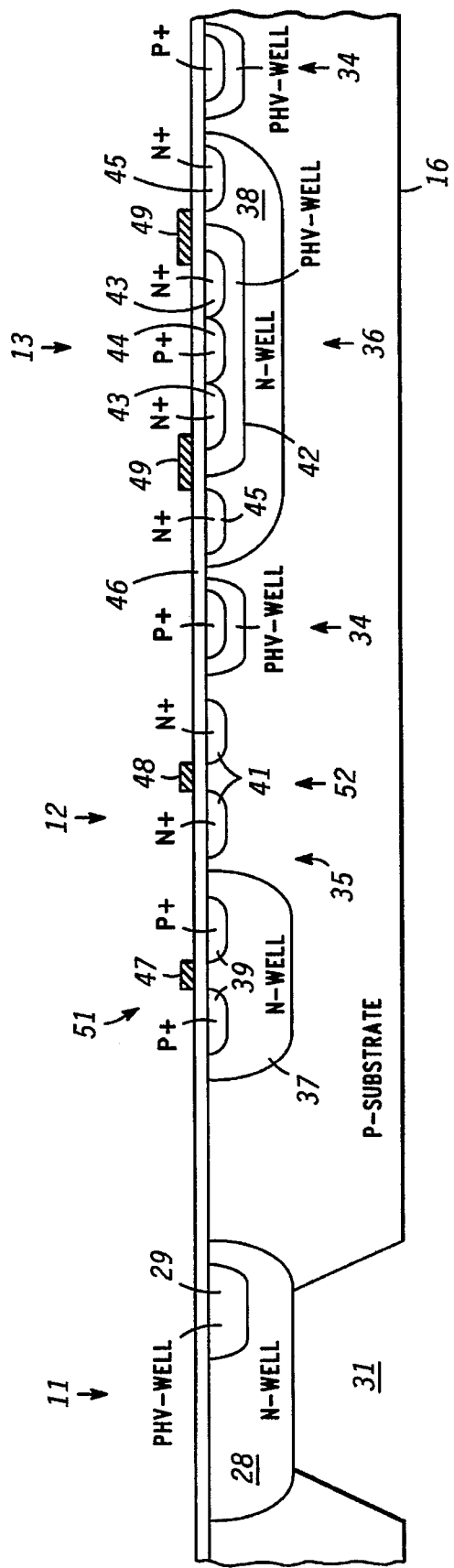
FIG. 4 illustrate a cross-sectional view of a portion of an integrated circuit of the present invention including a sensor device and a high current drive device.

A block diagram of an sensor integrated circuit 10 is shown in FIG. 1. Sensor cell 11 and control and driver circuit 12 are connected to a $V_{DD1}$ voltage supply and ground supply $V_{SS1}$. Sensor cell 11 produces an output which is coupled to control and driver circuit 12, and may optionally be coupled directly to power output driver 13. A detailed description of construction and function of sensor cell 11 is presented in reference to FIG. 2. Power output driver 13 is coupled to its own voltage supply $V_{DD2}$ and $V_{SS2}$ in order to minimize the effects of noise due to large current spikes through power output driver 13 on sensor cell supply ($V_{DD1}$ and $V_{SS1}$) levels. Power output driver 13 is further connected to output terminals 15 for driving a load.

Control and driver circuit 12 is coupled to power output driver 13 and has two basic functions which include providing a driver voltage whose magnitude can be greater than the magnitude of the voltage level of the $V_{DD1}$ supply voltage, and providing necessary current drive to turn power output driver 13 on and off within a specified time interval. Control and driver circuit 12 comprises small scale integrated logic devices and may optionally provide functions such as protection of power output driver 13 from voltage or current transients. Magnitude of $V_{DD1}$ may be greater than the magnitude of $V_{DD2}$, in which case magnitude of the driver voltage may be equal to the $V_{DD1}$ supply voltage and still achieve maximum performance of power output driver 13. Optionally, an external input control and driver 12 may be provided to allow external control of control and driver 12.

For ease of illustration sensor cells 11 are illustrated as a single block in FIG. 1, but it is contemplated that several sensor cells 11 may be included on a single integrated circuit. Further, each of these sensor cells 11 may be of a different type, for example, one sensor cell 11 may be a pressure sensor and another may be a chemical sensor. Each sensor cell 11 is coupled as shown in FIG. 1, however. Likewise, a plurality of power output drivers 13 will often be desirable, each power output driver being coupled in the manner illustrated by a single block in FIG. 1.

FIG. 2 illustrates a more detailed block diagram of sensor cell 11 shown in FIG. 1. In its simplest form sensor cell 11 would include only an environmental sensor 26 which would be biased from $V_{DD1}$ and provide an analog output 22 to the remaining circuitry shown in FIG. 1. Environmental sensor 26 may be an electro-mechanical sensor such as an accelerometer or pressure sensor, or a non-mechanical sensor such as an optical sensor, Hall effect sensor, or chemical sensor. Although each of these sensors is diverse in function, it has been found that they can be manufactured using many processes which are shared by high current drive devices, and therefore can be integrated into sensor cell 11 as set out in the present invention. Sensor cell 11 may also include a sensor bias circuit 24 which provides bias current and/or voltage to the sensor device. Bias circuit 24 may comprises passive components or small scale integrated logic devices and is preferably adjustable during manufacturing to compensate for process deviations in the sensor device. Adjustment can be made through resistor trimming techniques, for example.

Optionally, sensor cell 11 includes signal conditioning circuitry 27. Signal conditioning circuit 27 can be active or passive signal conditioning and usually performs some temperature compensation as well as some amplification and output magnitude control. When included, signal conditioning circuitry 27 provides analog or digital output 22 from sensor cell 11.

Integrated circuits are available today which perform all of the functions of sensor cell 11. An example of a passive temperature compensated pressure sensor is the MPX2100 manufactured by Motorola, Inc. An example of an active compensation, including some signal amplification as well as temperature compensation, is the MPX5100 manufactured by Motorola, Inc. An example of a pressure sensor device which could be used for environmental sensor 26 is found in U.S. Pat. No. 4,317,126 issued to John E. Gragg and assigned to the same assignee as the present invention. Examples of temperature compensation circuits which would be incorporated in sensor cell 12 include those shown in U.S. Pat. No. 4,463,274 and U.S. Pat. No. 4,465,075 issued to Craig Swartz and assigned to the same assignee as the present invention and incorporated herein by reference. An example of a non-mechanical sensor which could also be used in sensor cell 11 is shown in U.S. Pat. No. 4,100,563 issued to Lowell E. Clark on Jul. 11, 1978 and incorporated herein by reference.

FIG. 3 illustrates a layout of the high current drive sensor integrated circuit shown in FIG. 1, wherein the major circuit blocks are shown as they are located relative to each other on a monolithic circuit. FIG. 3 will be described in terms of a specific embodiment having a single sensor cell 11 and a single power output driver 13, but as set out hereinbefore a plurality of each of these components may actually be used. Because of the large currents flowing through power output driver 13, it is advantageous to physically locate sensor cell 11 at a maximum distance from power output driver 13. This is due to both junction temperature and excessive parasitic substrate currents generated by power output driver 13. The reference numerals used to identify structures in FIG. 1 are used in FIG. 3 to identify the same structures.

Sensor cell 11 is designed in a manner that places the sensor device and bias circuitry as far as possible from power output drive 13, or in other words, the least heat sensitive circuits of sensor cell 11 are placed nearer power output driver 13. The least heat sensitive circuits include any temperature compensation circuitry and any inactive portions of the sensor device, while more heat sensitive circuits vary depending on the configuration of the bias circuitry 24 and environmental sensor 26 shown in FIG. 2.

Control and driver circuit 12 is located between sensor cell 11 and power output driver 13, further buffering the two circuits. This is a logical placement in that control and driver circuit 12 receives inputs from sensor cell 11 and drives power output 13. Temperature sense circuit 17 is used to monitor temperature of power output drivers 13, and so is located near power output (not shown) could be incorporated near sensor cell 11 to driver 13. Optionally, another temperature sense circuit more accurately monitor temperature on that portion of he chip. A deep guard ring 34 is shown surrounding power output driver 13 which acts to collect substrate currents. Deep guard ring 34 is connected to the $V_{SS2}$ bus and comprises a $P^+$ region diffused into a $P^-$ well thus collecting substrate currents deeper in the substrate due to the increasing depth in area of the P well. Deep guard ring 34 is effective for collecting the potentially large parasitic substrate currents because it extends farther down into substrate 16 than a $P^+$ ring alone.

FIG. 4 illustrates a cross-sectional view of one embodiment of the integrated circuit of the present invention. Sensor cell 11 is illustrated by a conventional pressure transducer as a pressure transducer is one of the more difficult structures to integrate with high current drive devices. It should be apparent that other environmental sensor structures may be incorporated in sensor cell 11 using the same diffused regions which are available for a pressure transducer and power output driver 13. Control and driver circuitry can be formed with CMOS technology which is shown in the cross-section as transistors 35. Signal processing and conditioning, as well as sensor bias circuitry described hereinbefore as optional components of sensor cell 11 can be realized using transistors 35 also, and so have been omitted from FIG. 4. It should be understood that if sensor bias circuit and signal processing conditioning circuit are to be used, sensor cell 11 would further comprise additional CMOS circuitry.

Transistor structures of both control and driver circuit 12 and power output driver 13 are shown in cross-sectional view in FIG. 4 as devices 35 and 36, respectively. Devices 35 are typical of devices found in standard N-well CMOS process. Devices 36 use similar structural elements as devices 35 with the addition of high voltage P-well (PHV-well) 42 being formed in an N-well 38 and thus forming a portion of power output driver 13. It is possible to build sensor cell 11 on the same substrate as power output driver 13 by masking devices 35 during implantation of PHV-well 42 so that PHV-well 42 exists only in device 36 and sensor cell 11. Although an N-well process in a P-type substrate has been shown, it would be obvious to one of skill in the art that the complementary structure of P-wells in an N-type substrate is a viable alternate structure.

In devices 35, N-well 37 is first diffused into substrate 16. Simultaneously, N-well 38 in devices 36 is also diffused into substrate 16, with doping concentrations and profiles of N-wells 37 and 38 being equal and greater than doping concentration of substrate 16. PHV-well 42 is then formed in N-well 38 in device 36 and N-well 28 in sensor cell 11. PHV-wells have a doping concentration which is greater than that of the N-well 38 and 28. P-type regions 39 and 44 are then formed in N-well 37 and PHV-well 42. N-type regions 41, 43, and 45 are simultaneously formed in substrate 16, PHV-well 42, and N-well 38. Doping concentrations of N-type regions 41, 43, and 45, and P-type regions 39 and 44 are all greater than doping concentration of PHV-well 42. Dielectric 46 is grown on the surface and gates 47, 48, and 49 are deposited using processes well known in the art. Dielectric 46 may comprise one or more layers of oxide, silicon nitride, or the like.

P-type regions 39 in combination with gate 47 form a P-type field effect transistor 51, and N-type regions 41 in combination with gate 48 form an N-type field effect transistor 52. These complementary field effect transistors 51 and 52 then form necessary building blocks of control and driver circuit 12. A portion of power output driver 13 is depicted as an N-type lateral diffused MOS device wherein P-type region 44 provides an ohmic contact to PHV-well 42 in order to back bias a source of device 36. N-type region 43 forms a doughnut shaped region which surrounds P-type region 44. Similarly, N-type region 45 forms a doughnut shaped area which surrounds PHV-well 42. Gate 49 also forms a doughnut shaped region between N-type regions 43 and 45.

Device 36 is repeated to form an array in which all devices are then coupled in parallel to provide a power transistor. Guard rings 34, as shown in FIG. 4, surround device 36, or an array of devices 36, and is made up of a P-type region formed in a PHV well. As the number of devices 36 in an array increases, so does the channel width and power handling capability of power output driver 13.

Sensor cell 11 uses structural elements which are common to control and driver circuit 12 power output driver 13. Sensor cell 11 is illustrated as a pressure sensor because this is the most demanding sensor device to integrate with a high current drive device. Other environmental sensors can be built using similar structural elements as those illustrated in sensor cell 11. Most environmental sensors, including pressure sensors, magnetic sensors, and some chemical sensors can be incorporated in sensor cell 11 using the structural elements shown. Sensor cell 11 includes an N-well 28 formed in P-type substrate 16.

It is important to note that N-well 28 can serve as an etch stop for electrochemical etching to produce cavity 31. Electrochemical etching relies on a semiconductor PN junction to stop an anisotropic silicon etch, such as potassium hydroxide, during formation of cavity 31. By taking advantage of electrochemical etching cavity 31 can be formed late in processing or even as a last step before packaging. This "cavity last" ability greatly improves yield and adds great flexibility in combining sensor processes with power devices. N-well 28 thus forms a diaphragm which can flex when pressure is applied. PHV-well 29 is used to form a piezo-resistive element in sensor cell 11.

By now it should be appreciated that many circuit system advantages are realized by integrating a high current device with an environmental sensor. High power motors, pumps, compressors and the like can be contorted by environmental conditions in which they operate with a single, monolithic device. Additionally, the high current sensor device is able to monitor the substrate temperature and hence the operating temperature of the sensor portion of the integrated circuit directly since they share the same substrate, allowing improved temperature compensation and device calibration. Due to minimal spacing between the high current drive and sensor devices, communication between the devices is greatly improved.

We claim:

1. An integrated circuit comprising:
   a means for sensing an environmental condition external to the integrated circuit;
   a power output device coupled to the means for sensing for providing a current drive capability, wherein the means for sensing and the power output device are fabricated as a monolithic integrated circuit; and
   means for isolating the power output device from the means for sensing, wherein, the means for isolating comprising a guard ring surrounding the power output driver for collecting parasitic substrate currents.

2. The integrated circuit of claim 1 wherein the means for sensing comprises a micromachined electro-mechanical sensor.

3. The integrated circuit of claim 1 wherein the means for sensing comprises an optical sensor.

4. The integrated circuit of claim 1 wherein the means for sensing comprises an electromagnetic sensor.

5. The integrated circuit of claim 1 wherein the means for sensing comprises a chemical sensor.

6. The integrated circuit of claim 1 further comprising a control and driver circuit coupled between the means for sensing and the power output device, wherein the means for sensing, the control and driver circuit, and the power output device are fabricated as a monolithic integrated circuit.

7. The integrated circuit of claim 6 wherein the power output device has its own power supply terminal separate from any power supply terminal serving the remainder of the monolithic integrated circuit.

\* \* \* \* \*